United States Patent
McCloy

(10) Patent No.: US 8,972,982 B2
(45) Date of Patent: *Mar. 3, 2015

(54) GEOPHYSICAL VIRTUAL MACHINE POLICY ALLOCATION USING A GPS, ATOMIC CLOCK SOURCE OR REGIONAL PEERING HOST

(75) Inventor: Ian J. McCloy, Salford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,575

(22) Filed: Apr. 20, 2012

(65) Prior Publication Data

US 2013/0007738 A1    Jan. 3, 2013

Related U.S. Application Data

(63) Continuation of application No. 13/173,778, filed on Jun. 30, 2011.

(51) Int. Cl.
   G06F 9/46    (2006.01)
   G06F 9/455    (2006.01)

(52) U.S. Cl.
   CPC .... G06F 9/45558 (2013.01); *G06F 2009/4557* (2013.01)
   USPC .............................................. 718/1; 718/104

(58) Field of Classification Search
   None
   See application file for complete search history.

(56) References Cited

U.S. PATENT DOCUMENTS

| 4,582,434 A * | 4/1986 | Plangger et al. ................ 368/46 |
| 2003/0065571 A1 | 4/2003 | Dutta |
| 2005/0160423 A1 | 7/2005 | Bantz et al. |
| 2007/0142059 A1 * | 6/2007 | Wang ........................ 455/456.1 |
| 2007/0250833 A1 * | 10/2007 | Araujo et al. ..................... 718/1 |
| 2009/0031307 A1 | 1/2009 | Chodroff et al. |
| 2009/0083445 A1 | 3/2009 | Ganga |
| 2009/0144482 A1 * | 6/2009 | Tankleff ........................... 711/6 |
| 2009/0328030 A1 | 12/2009 | Fries |
| 2010/0115512 A1 | 5/2010 | Sakai |
| 2010/0319004 A1 | 12/2010 | Hudson et al. |
| 2010/0332635 A1 * | 12/2010 | Rogel et al. ................... 709/223 |
| 2011/0041126 A1 | 2/2011 | Levy et al. |
| 2012/0311575 A1 * | 12/2012 | Song ................................ 718/1 |
| 2013/0007734 A1 * | 1/2013 | McCloy ........................... 718/1 |

FOREIGN PATENT DOCUMENTS

| CN | 1334688 | 2/2002 |
| CN | 101460907 | 6/2009 |
| CN | 102024123 | 4/2011 |
| EP | 2098984 | 9/2009 |

OTHER PUBLICATIONS

Kamiya, Yuko et al.; Dynamic Wide Area Server Deployment System with Server Deployment Policies; IJCSNS International Journal of Computer Science and Network Security; Oct. 2010; vol. 10; No. 10; pp. 92-96.

Who has Legal Jurisdiction in the Cloud?; Internet website article; Aug. 23, 2010.

* cited by examiner

*Primary Examiner* — Mengyao Zhe
*Assistant Examiner* — Bradley Teets
(74) *Attorney, Agent, or Firm* — James L. Baudino

(57) ABSTRACT

According to one aspect of the present disclosure, a method and technique for virtual machine allocation is disclosed. The method includes: responsive to receiving a request to execute a virtual machine, determining a geophysical location of a host for the virtual machine; determining a geophysical policy for the virtual machine; determining whether the geophysical policy for the virtual machine corresponds to the geophysical location of the host for the virtual machine; and responsive to determining that the geophysical policy for the virtual machine corresponds to the geophysical location of the host, executing the virtual machine.

8 Claims, 5 Drawing Sheets

GEOPHYSICAL VIRTUAL MACHINE POLICY ALLOCATION USING A GPS, ATOMIC CLOCK SOURCE OR REGIONAL PEERING HOST

BACKGROUND

A virtual machine is a virtual sharing or partitioning of computer resources. For example, the virtually partitioned resources may include one or more processors, memory, storage, network cards, etc. Each virtual machine may run its own instance of an operating system and may run one or more applications on its operating system.

In a networked environment, virtual machines may be allocated in a variety of different locations. For example, in a cloud computing environment, virtual machines may be allocated based on demand for certain computer resources and/or functions. Further, virtual machines may often be migrated from one physical machine or host to another. For example, a virtual machine may be copied and moved to a different host system to provide a back-up system while hardware and/or software upgrades are installed. Virtual machines may also be migrated to better utilize available resources or in response to a system error or failure.

BRIEF SUMMARY

According to one aspect of the present disclosure a method and technique for allocating a virtual machine is disclosed. The method includes: responsive to receiving a request to execute a virtual machine, determining a geophysical location of a host for the virtual machine; determining a geophysical policy for the virtual machine; determining whether the geophysical policy for the virtual machine corresponds to the geophysical location of the host for the virtual machine; and responsive to determining that the geophysical policy for the virtual machine corresponds to the geophysical location of the host, executing the virtual machine.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
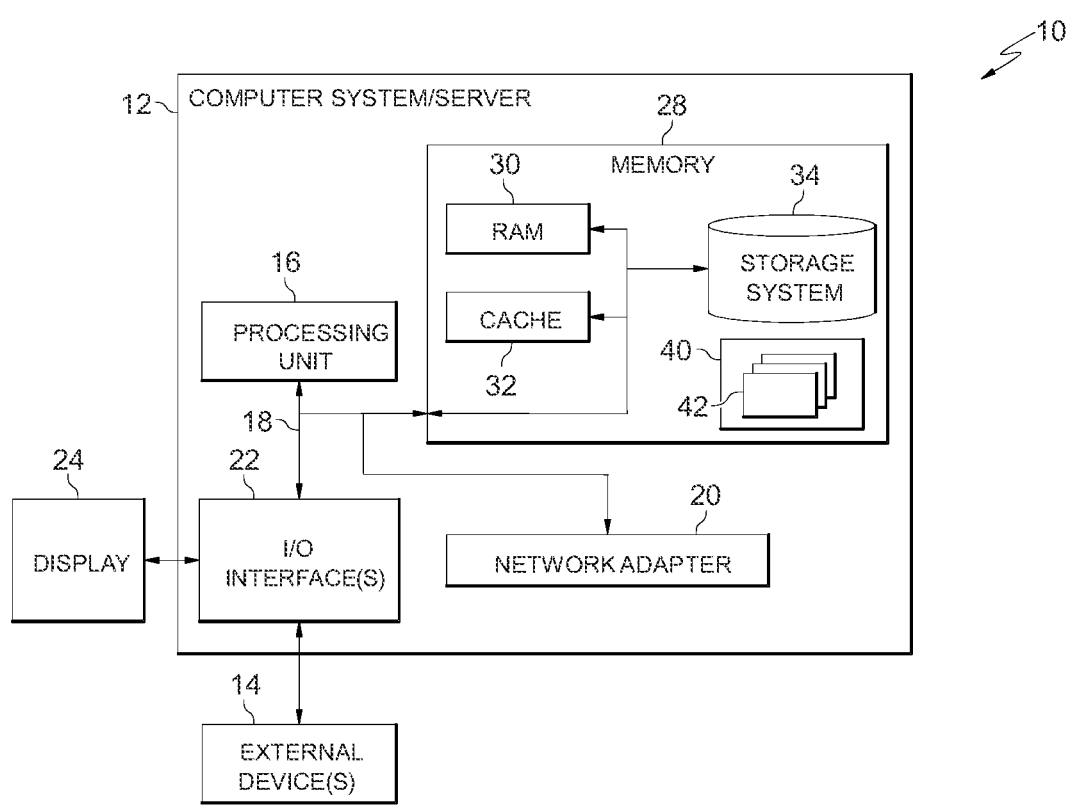
FIG. 1 depicts a cloud computing node according to an embodiment of the present invention.

Embodiments of the present disclosure provide a method, system and computer program product for virtual machine allocation. For example, in some embodiments, the method and technique includes: responsive to receiving a request to execute a virtual machine, determining a geophysical location of a host for the virtual machine; determining a geophysical policy for the virtual machine; determining whether the geophysical policy for the virtual machine corresponds to the geophysical location of the host for the virtual machine; and responsive to determining that the geophysical policy for the virtual machine corresponds to the geophysical location of the host, executing the virtual machine. Thus, embodiments of the present disclosure enable virtual machine allocation and migration while ensuring that policies related to the geophysical location where the virtual machine may be run are maintained. For example, while a virtual machine may be allocated or migrated across geographical borders, geophysical policies for the virtual machine may prohibit the virtual machine (or the functions related thereto) from being executed/performed in certain geographic jurisdictions. Embodiments of the present disclosure verify a geophysical location of a host for the virtual machine to enable the geophysical policies associated with the virtual machine to be compared against the geophysical location of the host before the virtual machine is executed on or migrated to the target host.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
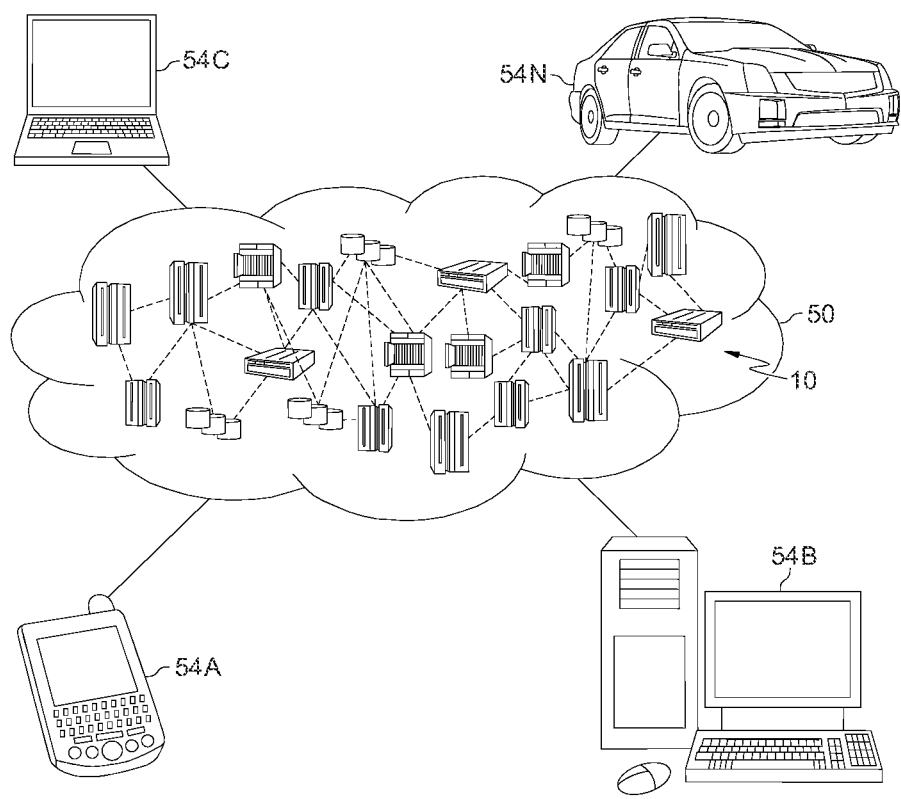
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
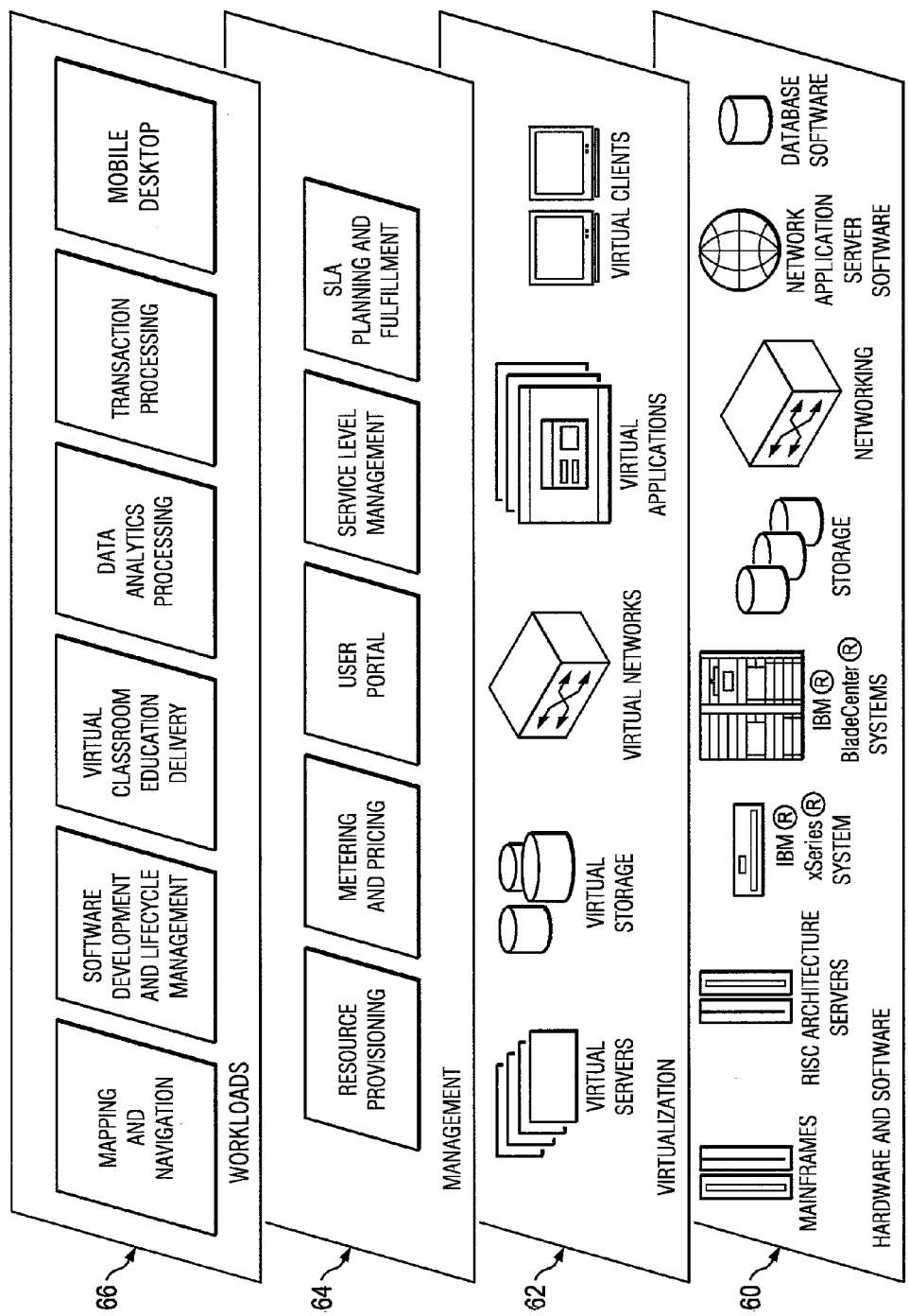
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual machines, including virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Service level management may also include virtual machine allocation and management such that the migration and/or execution of virtual machine resources (e.g., various workload or application processing) complies with the geophysical host location.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop functions.

Figure 4:
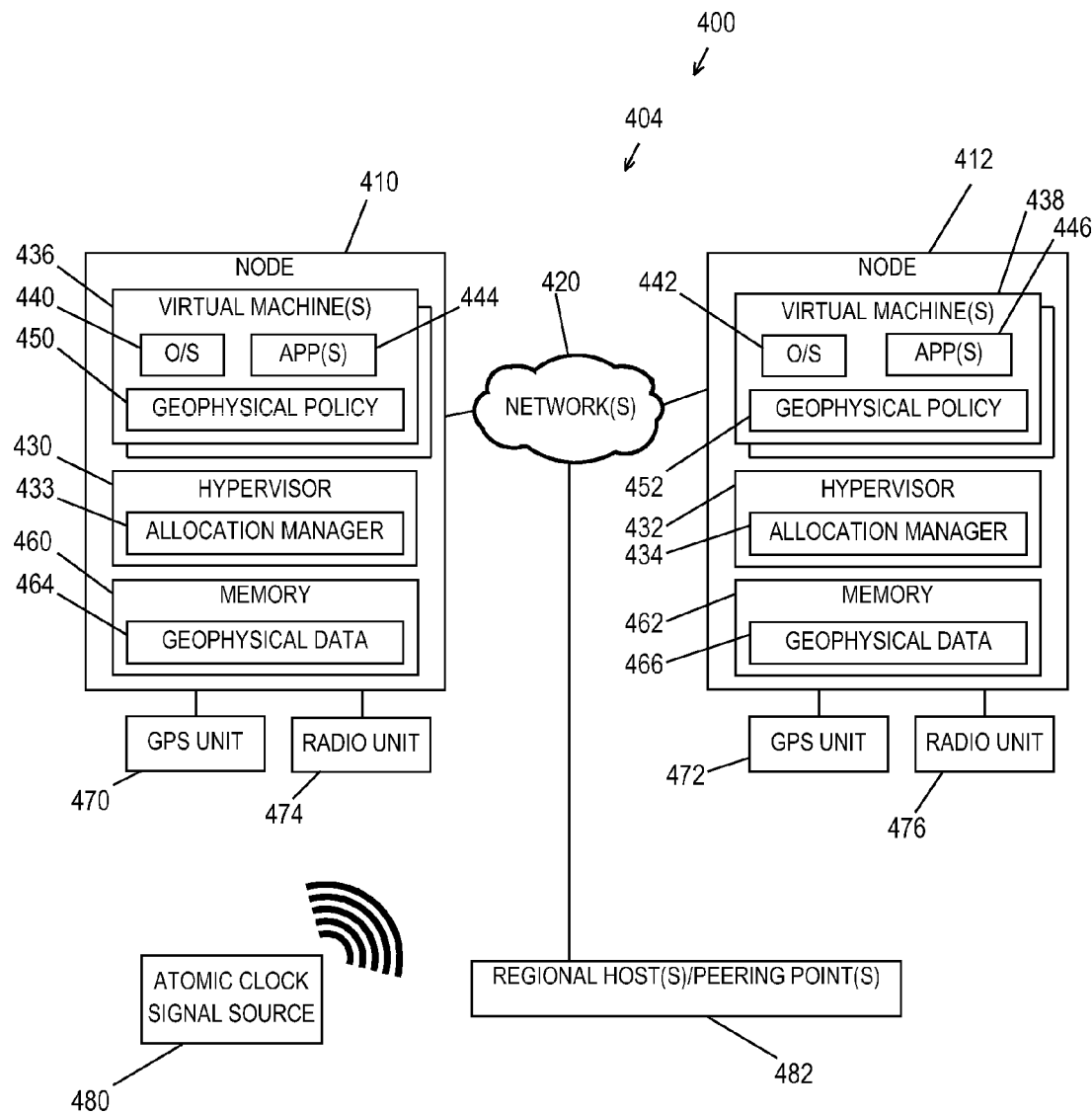
FIG. 4 depicts an embodiment of a data processing system in which illustrative embodiments of a virtual machine allocation system may be implemented.

FIG. 4 is an illustrative embodiment of a system 400 for virtual machine allocation. System 400 may be implemented on data processing systems or platforms such as, but not limited to, node 10 or at other data processing system locations. In the embodiment illustrated in FIG. 4, system 400 comprises a network environment 404 including hosts 410 and 412 connectable to each other via a network 420. Any number of network topologies may be used for network 420 such as, but not limited to, a high speed point-to-point bus, a LAN, a WAN, and combinations thereof. Hosts 410 and 412 may be physically located in close proximity to each other or remotely located. Hosts 410 and 412 may comprise servers, workstations, or other types of computing platforms (e.g., such as node 10 as depicted in FIG. 1). Accordingly, as will be discussed in further detail below, hosts 410 and 412 may include a processing device (e.g., CPU) capable of reading and executing instructions, running a variety of types of applications, and operate and/or serve as a web server, etc. Hosts 410 and 412, including various functions provided thereby, may be provisioned as a cloud resource. For example, in some embodiments, hosts 410 and/or 412 may be accessed over a public network such as the Internet. In the embodiment of FIG. 4, two hosts are illustrated; however, it should be understood that a greater quantity of hosts may be included in the network environment 404. Further, it should be understood that the methods and functions described in the present disclosure may be implemented on a single host.

In the embodiment illustrated in FIG. 4, hosts 410 and 412 represent physical computing and/or data processing platforms each respectively executing hypervisors 430 and 432 and virtual machines 436 and 438. A "hypervisor" generally refers to a low-level application that supports allocation and/or execution of one or more virtual machines. For example, each of hypervisors 430 and 432 may respectively include an allocation manager 433 and 434 for allocating and/or logically dividing and virtualizing computer resources (including the allocation and/or sharing of one or more processing devices and/or memory) to thereby form a platform for each of the respective virtual machines 436 and 438. Multiple virtual machines may be allocated on each host 410 and 412. Each virtual machine 436 and 438 may respectively support an instance of an operating system 440 and 442 and one or more applications 444 and 446 executable on the virtual processing device allocated to the respective virtual machine 436 and 438. Thus, each hypervisor 430 and 432 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). In FIG. 4, two hosts 410 and 412 are illustrated to enable illustration and description of a migration of a virtual machine from one host to another host; however, it should be understood that each host 410 and 412 may be configured differently.

In the embodiment illustrated in FIG. 4, each virtual machine 436 and 438 respectively includes a geophysical policy 450 and 452. Each geophysical policy 450 and 452 sets forth information indicating a geophysical location where the respective virtual machine 436 and 438 may be executed. For example, if a particular virtual machine is utilized in a bank processing capacity, the banking institution owning, operating and/or otherwise causing execution of the virtual machine may be licensed to perform the bank processing functions in certain geographical jurisdictions (e.g. the United States and Spain). Thus, the geophysical policy for this exemplary virtual machine may include information indicating that the virtual machine may only be executable in the geographic regions of the United States and Spain. Because of virtual machines may be executed and/or migrated between hosts of differing geophysical locations, the present disclosure uses the geophysical policies 450 and/or 452 to control where the virtual machine and workloads are running.

In FIG. 4, each host 410 and 412 also respectively includes a memory 460 and 462 having geophysical data 464 and 466. Geophysical data 464 and 466 includes information representing the geophysical location of respective hosts 410 and 412. For example, in some embodiments, geophysical data 464 and 466 may be manually input by an administrator to respective hosts 410 and 412 and stored in respective memories 460 and 462 indicating the geophysical location of respective hosts 410 and 412. In some embodiments, as will be described in greater detail below, the geophysical location of hosts 410 and 412 may be automatically determined and/or derived from various types of information (e.g., information gathered from an external source). Once determined, the geophysical location of hosts 410 and 412 may be stored in respective memories 460 and 462 as geophysical data 464 and 466.

In the embodiment illustrated in FIG. 4, each host 410 and 412 has coupled thereto and/or associated therewith a respective global positioning system (GPS) unit 470 and 472 and a radio unit 474 and 476. GPS units 470 and 472 are used to provide geophysical location data to respective hosts 410 and 412 based on a location of the respective GPS units 470 and 472. Thus, in some embodiments, GPS units 470 and 472 are located in close proximity to and/or otherwise may form part of respective hosts 410 and 412 to enable hypervisors 430 and 432 to acquire the geophysical location data from the respective GPS units 470 and 472 to derive and/or otherwise determine a geophysical location of hosts 410 and 412.

In some embodiments, hypervisors 430 and 432 determine a geophysical location of respective hosts 410 and 412 using respective radio units 474 and 476 and the receipt of an atomic clock signal from an atomic clock signal source 480. For example, different geographical locations throughout the world have atomic clock signal sources that broadcast radio signals (e.g., in the microwave, ultraviolet or optical region of the electromagnetic spectrum) to enable atomic clocks to maintain an accurate (or substantially accurate) time. The frequencies of the radio signals vary based on the geographical location of the signal source. Thus, in some embodiments, radio units 474 and 476 are used to detect and receive the radio signals emitted by an atomic clock signal source 480 in close proximity to the respective host 410 and 412. Based on the frequency of the received radio signal, hypervisors 430 and 432 may derive a geophysical location of the signal source 480 and use the geophysical location of the signal source 480 as the geophysical location of the respective host 410 and 412. For example, in some embodiments, radio units 474 and 476 may be configured to scan across different frequencies to detect an atomic clock signal. Once detected, hypervisors 430 and 432 may use the frequency of the detected signal to determine a geophysical location of source 480 (e.g., by using relational information correlating different frequencies to different geographical atomic signal sources). Thus, for example, if the received signal is detected at a frequency known to be emitted from a Denver, Colo. signal source, the particular host may use that geophysical location (or the United States) as the geophysical location for the host.

In some embodiments, hypervisors 430 and/or 432 may cause respective hosts 410 and/or 412 to communicate with one or more known regional hosts or peering points 482 and use signal latency checking to derive a location of the respective hosts 410 and/or 412. For example, in some embodiments, the latency of communications between host 410 and one or more regional hosts 482 may be used to determine and/or otherwise triangulate a geophysical location of host 410.

Thus, in operation, in response to receiving a request to execute a virtual machine (e.g., virtual machine 436), hypervisor 430 accesses and/or otherwise determines the geophysical policy 450 for the virtual machine 436. The request to execute the virtual machine may be a request for initialization or original allocation of a virtual machine or a request to migrate a virtual machine (e.g., from host 412 to host 410). Hypervisor 430 also determines a geophysical location of host 410. For example, in some embodiments, hypervisor 430 may automatically derive and/or otherwise determine a geophysical location of host 410 utilizing GPS unit 470, radio unit 474 and/or communicating with one or more regional hosts 482. The geophysical location of host 410 may be determined in response to receiving a request to execute a virtual device and/or may be automatically determined upon booting or start-up of host 410. In some embodiments, hypervisor 430 may access stored geophysical data 464 (which may be data manually input by an administrator) and verify the integrity of the geophysical data 464 using external source information (e.g., utilizing GPS unit 470, radio unit 474 and/or communicating with one or more regional hosts 482). If the geophysical data 464 integrity is verified thereby indicating a geophysical location of host 410 (or GPS unit 470, radio unit 474 and/or communicating with one or more regional hosts 482 is used to determine a geophysical location of host 410), hypervisor 430 compares the geophysical policy 450 of the virtual machine to be executed with the geophysical location of host 410. If the geophysical policy 450 of the virtual machine to be executed corresponds to or with the geophysical location of host 410, the virtual machine is executed. If not, hypervisor 430 may generate an alert or other notification indicating the lack of correspondence and abort execution of the virtual machine.

Thus, in some embodiments, in response to a request to migrate a virtual machine from one host (source host) to another host (target host), the target host may access the geophysical policy of the virtual machine to be migrated to verify that any geophysical policy requirements are cleared (i.e., the geophysical policy of the virtual machine to be migrated corresponds to the geophysical location of the target host) before migration of the virtual machine is allowed. Alternatively, the source host may request the geophysical location from the target host before migration to clear the geophysical policy of the virtual machine to be migrated. If the geophysical policy of the virtual machine to be migrated does not correspond to the geophysical location of the target host, migration of the virtual machine is denied and/or aborted.

In some embodiments, one or more automated methods may be used to determine the geophysical location of the host (e.g., utilizing GPS unit 470, radio unit 474 and/or communicating with one or more regional hosts 482). For example, in some embodiments, a single automated method may be used (e.g., GPS unit 470) while in other embodiments, multiple methods may be used (e.g., GPS unit 470 and latency checking communications with one or more regional hosts 482) as a means of verifying the integrity of each automated method (i.e., each automated method yielding a corresponding geophysical location result). Hypervisors 430 and 432 may also be configured to perform the automated geophysical host location inquiry on a periodic basis (e.g., at certain time intervals) or in response to certain events (e.g., each time a system clock is adjusted or each time the physical host is booted).

Figure 5:
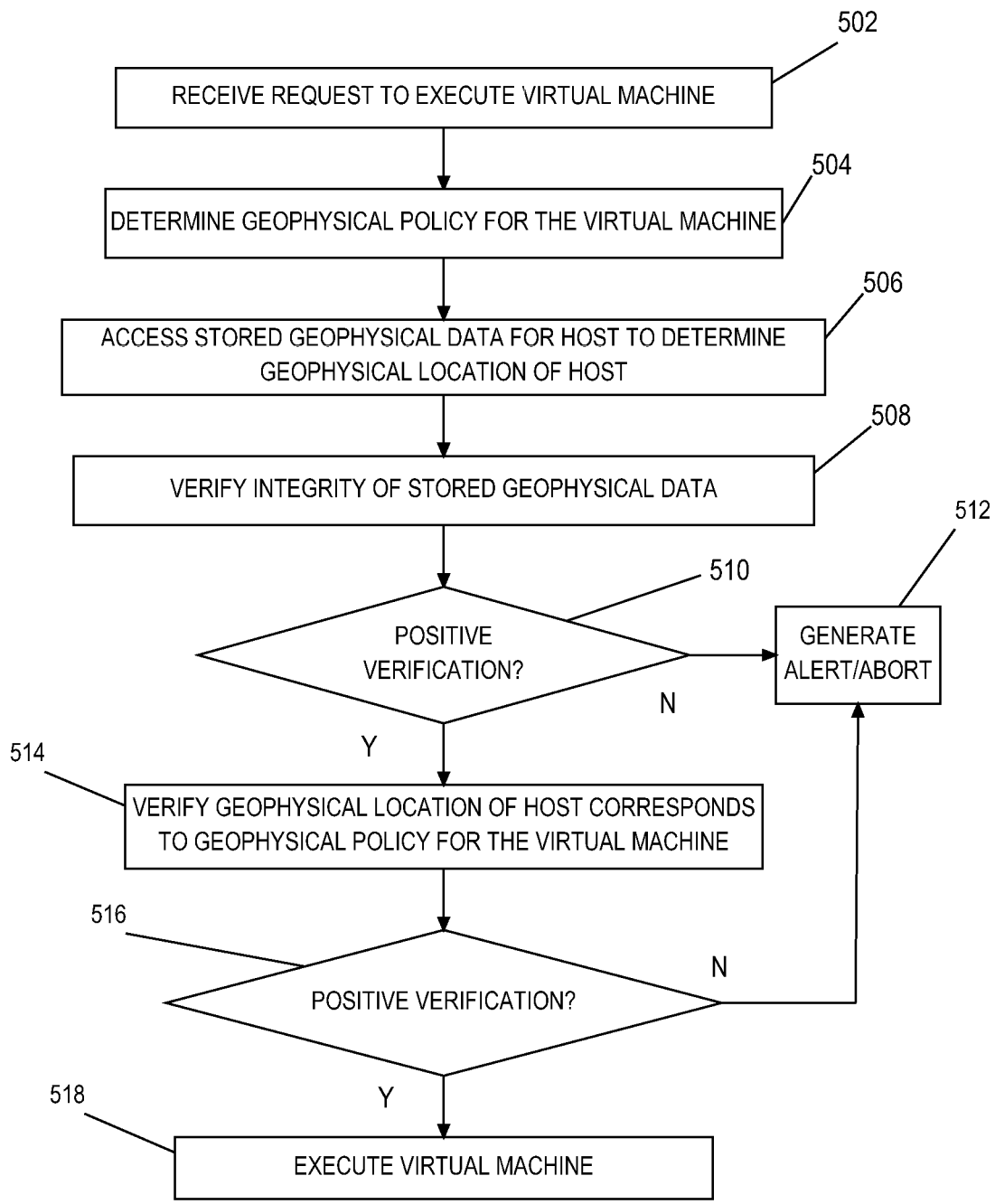
FIG. 5 depicts a flow diagram illustrating an embodiment of a virtual machine allocation method.

FIG. 5 is a flow diagram illustrating an embodiment of a method for virtual machine allocation. The method begins at block 502, where a request to allocate and/or execute a virtual machine is received (e.g., a request to execute virtual machine 436 received by hypervisor 430). At block 504, hypervisor 430 determines the geophysical policy 450 for virtual machine 436. At block 506, hypervisor 430 accesses stored geophysical data 464 for host 410. At block 508, hypervisor 430 verifies the integrity of stored geophysical data 464 indicating a geophysical location of host 410. For example, hypervisor 430 may use geophysical data acquired from GPS unit 470, a geophysical location of an atomic clock signal source 480 utilizing radio unit 474, and/or latency checking based on communications with one or more known regional peering points 482 to derive a geophysical location of host 410 and compare the derived geophysical location of host 410 with stored geophysical data 464. At decisional block 510, a determination is made whether the integrity of the stored geophysical data 464 is verified. If the integrity of the stored geophysical data 464 cannot be verified, the method proceeds to block 512, where hypervisor 430 generates an alert or notification of non-verification and execution of virtual machine 436 is aborted. If the integrity of the stored geophysical data 464 is verified, the method proceeds to block 514. It should be understood that in some embodiments, instead of accessing and verifying the integrity of stored geophysical data 464, hypervisor 430 may derive the geophysical location of host 410 (e.g., using geophysical data acquired from GPS unit 470, using a geophysical location of an atomic clock signal source 480 utilizing radio unit 474, and/or using latency checking based on communications with one or more known regional peering points 482) to derive a geophysical location of host 410 and proceed to block 514.

At block 514, hypervisor 430 compares the geophysical policy 450 for virtual machine 436 with the geophysical location of host 410. At decisional block 516, a determination is made whether the geophysical policy 450 for virtual machine 436 corresponds to the geophysical location of host 410. If not, the method proceeds to block 512, where hypervisor 430 generates an alert or notification of non-correspondence and execution of virtual machine 436 is aborted. If a determination is made that the geophysical policy 450 for virtual machine 436 corresponds to the geophysical location of host 410, the method proceeds to block 518, where virtual machine 436 is executed. It should be understood that although the above method has been described in connection with hypervisor 430 and host 410, the method is also applicable to hypervisor 432 and host 412. Further, the above-described method may be utilized in connection with a proposed migration of a virtual machine from one host (source host) to another host (target host) such that the geophysical policy of the proposed virtual machine for migration is cleared based on a geophysical location of the target host before migration/execution of the virtual machine on the target host.

Thus, embodiments of the present disclosure enable virtual machine allocation and/or migration while maintaining geophysical policies associated with the execution and running of the virtual machine. Further, embodiments of the present disclosure enable verification of a geophysical location of a host for a virtual machine to ensure that the geophysical policies associated with the virtual machine are maintained before allocation and/or migration of a virtual machine.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A virtual machine allocation method, comprising:
responsive to receiving a request to execute or allocate a virtual machine, determining a first geophysical location of a host for the virtual machine by acquiring geophysical data from one of:
a global positioning system unit coupled to the host;
data manually input by an administrator;
a radio signal received from an atomic clock source; or
signal latency of communications with at least one regional peering host;
verifying the first geophysical location corresponds to a second geophysical location of the host as indicated by second geophysical data stored on the host;
responsive to verifying that the first geophysical location corresponds to the second geophysical location, determining a geophysical policy for the virtual machine which indicates a geophysical location where the virtual machine may be executed or allocated;
determining whether the geophysical policy for the virtual machine corresponds to the geophysical location of the host for the virtual machine;

responsive to determining that the geophysical policy for the virtual machine corresponds to the geophysical location of the host, executing or allocating the virtual machine; and determining and re-verifying the first geophysical location of the host in response to a clock adjustment of the host.

2. The method of claim 1, further comprising:
determining a frequency of the received radio signal; and
determining a geophysical location of the atomic clock source based on the frequency.

3. The method of claim 1, wherein receiving the request to execute or allocate the virtual machine comprises receiving the request by a hypervisor of a cloud environment.

4. The method of claim 1, further comprising, responsive to determining that the geophysical policy for the virtual machine does not correspond to the first geophysical location of the host, generating an alert indicating non-execution of the virtual machine.

5. A method for virtual machine allocation, comprising:
responsive to receiving a request to execute or allocate a virtual machine on a host, determining a geophysical policy for the virtual machine, the geophysical policy identifying a geophysical location where the virtual machine is executable or allocatable;
determining a first geophysical location of the host by acquiring first geophysical data from one of:
  a global positioning system unit coupled to the host;
  data manually input by an administrator; or
  signal latency of communications with at least one regional peering host; or
scanning across a plurality of different frequencies searching for a signal from an atomic clock source;
responsive to detecting a signal from an atomic clock source, determining a frequency of the detected signal;
accessing relational information to identify a location of the atomic clock source based on the frequency of the detected signal;
determining and verifying the first geophysical location of the host based on the location of the atomic clock source;
determining whether the geophysical policy for the virtual machine corresponds to the first geophysical location of the host; and
responsive to determining that the geophysical policy for the virtual machine corresponds to the first geophysical location of the host, executing or allocating the virtual machine.

6. The method of claim 5, further comprising, responsive to determining that the geophysical policy for the virtual machine does not correspond to the first geophysical location of the host, generating an alert indicating non-execution of the virtual machine.

7. The method of claim 5, wherein receiving the request to execute or allocate the virtual machine comprises receiving the request by a hypervisor of a cloud environment.

8. A virtual machine allocation method, comprising:
responsive to receiving a request to execute or allocate a virtual machine, determining a first geophysical location of a host for the virtual machine by acquiring first geophysical data from one of:
  a global positioning system unit coupled to the host;
  data manually input by an administrator; or
  communicating with at least one regional peering host and analyzing signal latency of communications with the regional peering host
determining a second geophysical location of the host based on a frequency of a signal detected from an atomic clock source;
verifying that the first geophysical location corresponds with the second geophysical location;
responsive to verifying that the first geophysical location corresponds to the second geophysical location, determining a geophysical policy for the virtual machine which indicates a geophysical location where the virtual machine may be executed or allocated;
determining whether the geophysical policy for the virtual machine corresponds to the first geophysical location of the host;
responsive to determining that the geophysical policy for the virtual machine corresponds to the first geophysical location of the host, executing or allocating the virtual machine; and
re-verifying the first geophysical location of the host each time the host is booted.

* * * * *